United States Patent Office 3,449,154
Patented June 10, 1969

3,449,154
POLY-α-OLEFINS COATED WITH LACTAMS OR LACTONES AND METHODS FOR PRODUCING SAME
Leon Katz, Springfield, N.J., assignor to GAF Corporation, New York, N.Y., a corporation of Delaware
No Drawing. Filed Sept. 7, 1965, Ser. No. 485,610
Int. Cl. B44d 1/22; C08d 13/24; C09d 3/48
U.S. Cl. 117—93.1                                    18 Claims

ABSTRACT OF THE DISCLOSURE

A process for surface treating a poly-α-olefin which comprises exposing said surface to a gaseous polymerizable compound selected from the group consisting of lactams, lactones and N-vinyl lactams at a pressure below about 10 mm. of Hg, said gaseous polymerizable compound being in an activated state produced by an electrical glow discharge whereby polymerization on the said surface of poly-α-olefin of said gaseous compound occurs to form a polymerizate thereon.

---

This invention relates to new and outstanding useful coated products and methods for making same, and in particular to coated films and fibers of synthetic polymeric substances and to processes for producing such coated films and fibers.

The application of a coating material to a substrate may be desirable and/or necessary for innumerable reasons. In general, coatings are applied for their decorative and/or protective characteristics. Coatings may also be used for other utilitarian reasons as evidenced by adhesive coatings and the like. In addition, coatings are often employed to surface a material to permit the attainment of properties not possessed by the substrate which is coated. Thus, metals may be treated to prepare the surface thereof for subsequent chemical and physical operations. Similarly, plastics may be so treated. Any base material may be treated with a coating to facilitate the application of a subsequent coating. It has also been suggested, in order to improve various properties of synthetic polymeric substances, and particularly those in film and fiber form, to apply a coating to permit improved dyeability of the substrate. Normal coating operations are generally not satisfactory for this purpose since they tend to adversely affect the basic nature of the substrate material and this is particularly critical with the synthetic fibers employed in textile operations.

It has now been discovered that synthetic polymeric fibers and films may be treated in such a manner so as to have the surfaces thereof modified to permit subsequent operation such as dyeing to be performed thereon in a vastly improved manner. The specific treatment involves the deposition onto the fiber or film of an extremely thin layer of a polymeric substance, such layer ranging from 1 to no more than about 10 molecules in thickness, thereby preserving almost completely the desirable physical and chemical attributes of the substrate material and at the same time permitting such treated materials to be more efficiently and advantageously employed in subsequent operations such as dyeing and the like.

It is therefore an object of the present invention to provide new, useful and outstanding coated materials.

It is another object of this invention to provide processes for the production of such new useful coated materials.

It is still another object of this invention to provide improved synthetic polymeric substances, particularly in film and fiber form.

It is still another further object of this invention to provide processes for the production of synthetic polymeric substances, particularly in films and fiber form which are characterized by outstanding, unusual and improved properties.

It is still another further object of this invention to provide synthetic polymeric materials, particularly in film and fiber form, with coatings thereon which permit the utilization of such films, fibers and the like in subsequent operations to produce outstanding products, and especially improved dyeings.

It is a still further object of this invention to provide processes for producing polymeric coatings on synthetic polymeric substances, the latter particularly in the form of films and fibers whereby the properties thereof are vastly improved, especially with regard to dyeings and the like.

Other objects will appear hereinafter as the description proceeds.

In order to achieve the required and demanded variations of color in synthetic fibers and films through dyeing operations, a great variety of different techniques have been developed as well as a tremendous number of different and expensive dyestuffs which will be operable with different synthetic substances. The major difficulty attendant with the dyeing of a commercial synthetic polymeric film and fiber forming products lies in the hydrophobic nature of the polymer substance which makes it difficult to obtain satisfactory dyeing except under exotic conditions and/or by the use of specifically adapted and/or expensive dyestuffs. In addition to various dyeings techniques which have been developed to facilitate the dyeing of the so-called hydrophobic materials, it has also been suggested that dyeings may be improved by the incorporation with the hydrophobic products of dye-receptive additives. Thus, it is known to employ polyvinyl pyrrolidone as an additive to acrylic polymer substances for this purpose. The use of additives, however, has the major disadvantage in that relatively large amounts are generally necessary and in such quantities the basic properties of the hydrophobic material are changed. The employment of dye receptive coatings on hydrophobic substrates even more greatly detrimentally affects the properties of the substrate and such techniques have not been acceptable. It has now been discovered that the deposition of extremely minute quantities of certain polymeric substances on these hydrophobic base materials not only does not adversely affect the properties of the base material, and particularly the textile properties, but dyeability is vastly improved thereby, obviating expensive dyeing procedures and dyestuffs. In addition, materials which have not been successfully dyed such as polyolefins can now be dyed by the most conventional of dyeing procedures to obtain the entire spectrum of color.

The objects of the present invention are achieved by employing lactams, lactones or vinyl lactams in the monomeric state and effecting polymerization thereof by a glow discharge technique in the presence of the substrate material. By this technique it is possible to deposit mono molecular layers of polymeric material on the base product and by mono molecular material it is intended to mean not only a single layer but several up to about ten. Such extremely minute coatings, nevertheless, permit the resultant products to be dyed by conventional techniques, as will be illustrated below.

The monomers which are contemplated in the processes of the present invention may be structurally depicted by the following formula:

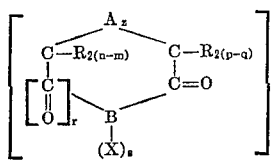

wherein:
(1) A is oxygen, nitrogen or sulfur,
(2) B is oxygen or nitrogen,
(3) the R's are independently, hydrogen, alkyl, substituted alkyl (e.g., alkoxy, chlorolkyl, bromoalkyl, hydroxyalkyl, alkoxyalkyl, carbalkoxyalkyl, cyanoalkyl and the like), aryl and substituted aryl (e.g., phenyl, tolyl, xylyl, alkoxyphenyl, chlorophenyl, carbalkoxyphenyl, alkylsulfonylphenyl, alkylaminophenyl and the like,) cycloalkyl and the like,
(4) $n$ and $p$ have values from 0 to 15,
(5) $n+p$ has a value of at least 2,
(6) $z$ has a value of 0 or 1,
(7) $r$ has a value of 0 or 1,
(8) $m$ and $q$ are the number of double bonds in the chains $C_n$ and $C_p$, respectively,
(9) X is hydrogen, alkyl, alkenyl or alkinyl, and
(10) $s=0$ when B is oxygen, and $s=1$ when B is nitrogen.

The following are illustrative of suitable R groups:
(A) Alkyl of 1 to 50 carbon atoms,
(B) Alkoxyalkyl of 1 to 50 carbon atoms, independently in each alkyl moiety, e.g., $C_2H_5$—$OC_2H_5$—
$C_{17}H_{35}OC_2H_5$—
$C_{50}H_{101}OC_2H_5$—
$C_{20}H_4OC_{20}H_{41}$—
$C_{50}H_{101}OC_{30}H_{61}$
$CH_3OC_{50}H_{101}$—

(C) Halo derivatives of (A) and (B) (both mono and polyhalo), e.g., bromoethyl
1-bromodecyl
1-bromoeicosyl
2-bromooctadecyl
2-chlorooctadecyl
18-chlorooctadecyl
2,3-dibromooctadecyl
4,5-dibromooctadecyl
6,7-dibromooctadecyl
9,10-dibromooctadecyl
11,12-dibromooctadecyl
6,7-dichlorooctadecyl
8,9-dichlorooctadecyl
18-fluorooctadecyl
9-fluorooctadecyl
8,9,11,12-tetrabromooctadecyl
5-bromodecyl
1-chlorodecyl
1-chloro-10-iododecyl
1,10-dibromodecyl
5,6-dibromodecyl
1,2-dichlorodecyl
1-iododecyl
2-iododecyl
1,5,6,10-tetrachlorodecyl
1-bromobutyl
2-bromobutyl
1-bromo-3-chlorobutyl
1-bromo-4-chlorobutyl
2-bromo-3-chlorobutyl
1-bromo-4-fluorobutyl
2-chlorobutyl
2,3-dibromobutyl
1-chloro-4-iodobutyl (D) cyanoalkyl (alkyl of 1 to 50 carbon atoms),
(E) hydroxyalkyl (alkyl of 1 to 50 carbon atoms),
(F) alkoxy (alkyl of 1 to 50 carbon atoms),
(G) carbalkoxy

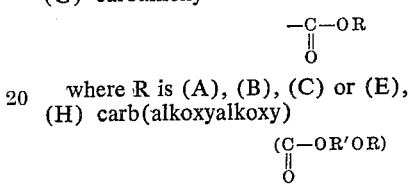

where R is (A), (B), (C) or (E),
(H) carb(alkoxyalkoxy)

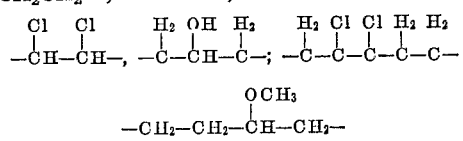

wherein R is as in (G) and R' is selected similarly but independently and is, of course, bivalent, e.g., —$CH_2$—; —$CH_2CH_2$—; —CHCl—;

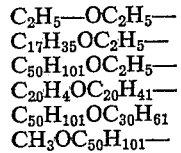

(I) aryl (e.g., phenyl, tolyl, xylyl, naphthyl, etc.),
(J) substituted aryl (substituents such as halo; alkoxy; alkylsulfonyl; carbalkoxy; alkylamino; etc.),
(K) cycloalkyl (cyclopentyl, cyclohexyl and substituted forms thereof).

Specific lactams include:

3-methyl pyrrolidone
4-methyl pyrrolidone
5-methyl pyrrolidone
3-ethyl pyrrolidone
4-ethyl pyrrolidone
5-ethyl pyrrolidone
3,3-dimethyl pyrrolidone
4,4-dimethyl pyrrolidone
5,5-dimethyl pyrrolidone
3,3,5-trimethyl pyrrolidone
3,5,5-trimethyl pyrrolidone
4,5,5-trimethyl pyrrolidone
N-methyl-2-pyrrolidone
N-ethyl-2-pyrrolidone
N-butyl-2-pyrrolidone
N-hydroxyethyl-2-pyrrolidone
N-2-chloroethyl-2-pyrrolidone
N-phenyl-2-pyrrolidone
N-vinyl-2-pyrrolidone
as well as these N-substituted compounds of the above enumerated N-hydrogen pyrrolidones.

2-imidazolidone (2-imidazolidinone) and the following substituted products:
1-acetyl-5-hexyl
1-acetyl-5-phenyl
1-benzoyl-5-cyclohexyl
1-benzoyl-5-methyl
4-benzoyl-5-methyl
1-cyclohexyl
4-cyclohexyl
4-methyl
1-dodecyl
1-isopropyl-4,4-dimethyl
1-methyl-4-phenyl
4,4,5,5-tetramethyl
4,5-dimethyl 5-ethyl
5-phenyl
5-propyl
5-butyl
5,5-dimethyl
4,5-diethyl
3-morpholinone and derivatives, e.g.,
    2-methyl
    2-phenyl
    2-butyl
    2,2-dimethyl
    5-methyl
2-piperidone and derivatives, e.g.,
    3-methyl
    4-methyl
    5-methyl
    6-methyl
    3-ethyl
    4-ethyl
    5,5-diethyl
    5,6-dimethyl
    5-ethyl-6-methyl
    6-ethyl-3-methyl
2-caprolactam and derivatives, e.g.,
    3-ethyl
    5-ethyl
    6-ethyl
    7-ethyl
    3-methyl
    4-methyl
    5-methyl
    6-methyl
    3,6-dimethyl
    4,6-dimethyl
    4,7-dimethyl
    7,7-diethyl
    4-ethyl-6-methyl
2-oxazolidinone and derivatives, e.g.,
    5-(2,5-diethoxyphenyl)
    5,5-diethyl
    4,4-dimethyl
    4,5-dimethyl-5-phenyl
    4,5-dimethyl-5-propyl
    4,5-diphenyl
    5,5-diphenyl
    4-ethyl
    5-ethyl-4-methyl
    5-ethyl-5-phenyl
    5-isobutyl-5-methyl
    4-(methoxymethyl)-5-phenyl
    5-methyl
    5-methyl-4-phenyl
    4-methyl-5-phenyl
    5-butyl
    5-propyl
    4,5-diethyl
    4-phenyl
    5-phenyl
    4,5,5-triphenyl
2-oxazinidinone (2-pentoxazolidone) and derivatives, e.g.,
    4-methyl
    6-methyl
    4-ethyl
    6-isopropyl
hexahydropyrimidone and derivatives, e.g.,
    5-hydroxy
    4-methyl
    4-ethyl
    4-propyl
    1-phenyl
    4,4,6-trimethyl
    1,4,6-trimethyl
4-oxazolidinone and derivatives, e.g.,
    2,2-diethyl-5,5-dimethyl
    2,5-diphenyl
    2,2,5,5-tetraethyl
    2,2,5,5-tetramethyl
    2-acetyl-2,5,5-trimethyl
2-pyridone
2-pyrrolone
4-thiazoline-2-one
2-thiazolidinone
5-methyl-2-thiazolidinone
4-methyl-2-thiazolidinone
4,5-dimethyl-2-thiazolidinone
4-thiazolidinone
5-butyl-4-thiazolidinone
2-(p-chlorophenyl)-5-ethyl-4-thiazolidinone
2,2-diphenyl-4-thiazolidinone
succinimide and the following derivatives, e.g.,
    3-benzyl-2-hydroxy-2-phenethyl
    2-(o-carboxyphenylthio)
    2-(o-chlorophenyl)
    2-cyclohexenyl
    2,2-diethyl-3-methyl
    2,2-dimethyl
    2,3-dimethyl-2-phenyl
    2,3-diphenyl
    2,2-diphenyl-3-propyl
    2-dodecyl-3-methyl
    2-ethyl-3-phenyl
    3-methyl
    2-methyl-2-phenyl
glutarimide and the following derivatives, e.g.,
    2-benzyl-2-phenyl
    4-bromo-2,2-diethyl
    4-bromo-2,3-dimethyl
    4-bromo-2,2-diphenyl
    2(p-chlorophenyl)-2-ethyl
    2(p-chlorophenyl)-2-phenyl
    2-cyano
    2-cyano-3,3-dimethyl
    2-cyano-2-methyl
    2-cyclohexyl-2-phenyl
    2,2-diphenyl
    2-ethyl-3-methyl
    2-ethyl-4-methyl
    3-ethyl-3-methyl
    2-ethyl-2-phenyl
diglycolyimide
2-oxo-octamethyleneimine
adipimide
2-ethyl-2-phenyl adipimide
2,2-diphenyl The various substituents shown above on the N-atom of 2-pyrrolidone can also be used as substituents on the other lactams. Suitable lactones include:
γ-butrolactone
γ-valerolactone
δ-valerolactone
ε-caprolactone
δ-caprolactone
α-methyl-δ-valerolactone
α-ethyl-δ-valerolactone
α-n—propyl-δvalerolactone
α-isopropyl-δ-valerolactone
α-n-amyl-δ-valerolactone
α-isoamyl-δ-valerolactone
α-isohexyl-δ-valerolactone
α-2-ethylhexyl-δ-valerolactone
α-nonyl-δ-valerolactone
α-tridecyl-δ-valerolactone
α,α-dimethyl-δ1valerolactone
α,α-diethyl-δ-valerolactone
β-methyl-δ-valerolactone
β-ethyl-δ-valerolactone
α,β-dimethyl-δ-valerolactone
β,β-dimethyl-δ-valerolactone
β,β-diethyl-δ-valerolactone
β-methyl-β-ethyl-δ-valerolactone
β-n-propyl-δ-valerolactone β-isopropyl-δ-valerolactone
β-n-butyl-δ-valerolactone
β-isobutyl-δ-valerolactone
β-n-heptyl-δ-valerolactone
γ-methyl-δ-valerolactone
γ-ethyl-δ-valerolactone
γ-isopropyl-δ-valerolactone
γ-n-butyl-δ-valerolactone
γ-isobutyl-δ-valerolactone
γ-isoamyl-δ-valerolactone
γ-dodecyl-δ-valerolactone
γ,γ-dimethyl-δ-valerolactone
γ-methyl-δ-pentyl-δ-valerolactone
α-methyl-δ-butyl-δ-valerolactone
δ-ethyl-δ-valerolactone (δ-enantholactone, δ-heptolactone)
δ-isopropyl-δ-valerolactone
δ-isobutyl-δ-valerolactone
δ-n-amyl-δ-valerolactone
α,α-dimethyl-δ,δ-dipropyl-δ-valerolactone
α,γ,γ-trimethyl-β-ethyl-δ-valerolactone
δ,δ-dimethyl-δ-valerolactone
α-ethyl-δ-caprolactone
α-methyl-δ-caprolactone
β,β-dimethyl-δ-caprolactone
α-isopropyl-δ-caprolactone
β-methyl-δ-caprolactone
γ,γ-dimethyl-δ-caprolactone
γ-ethyl-δ-caprolactone
β-methyl-ε-caprolactone
β-methyl-ε-caprolactone
δ-methyl-ε-caprolactone
ε-ethyl-ε-caprolactone
ε-methyl-ε-caprolactone
β-octyl-ε-caprolactone
β-δ-dimethyl-ε-caprolactone
β-methyl-ε-isopropyl-ε-caprolactone
ε-methyl-β-isopropyl-ε-caprolactone
3,5,5-trimethyl-ε-caprolactone
3,3,5-trimethyl-ε-caprolactone
β,β,δ,δ-tetramethyl-ε-caprolactone
β,β-diethyl-δ,δ-dimethyl-ε-caprolactone
α-isopropyl-ε-caprolactone
α-n-propyl-ε-caprolactone
α-n-butyl-ε-caprolactone
α-isooctyl-ε-caprolactone
β-isopropyl-ε-caprolactone
β,β-disopropyl-ε-caprolactone
ε-isopropyl-ε-caprolactone
α-methyl-ε-isopropyl-ε-caprolactone
α,α-dimethyl-ε-isopropyl-ε-caprolactone
ω-enantholactone
α-methyl-ω-enantholactone
α,α-dimethyl-ω-enantholactone
β-methyl-ω-enantholactone
δ-methyl-ω-enantholactone
β-ethyl-ω-enantholactone
β,β-dimethyl-ω-enanthoblactone
β,β-diethyl-ω-enantholactone
ω-caprylolactone
ω-nonanalactone
ω-decanalactone
β-methyl-ω-caprylolactone
tridecanolid (13.1)
tetradecanolid (14.1)
pentadecanolid (15.1) [exaltolide]
hexadecanolid (16.1)
heptanolid (17.1)
2,3,4-trimethyl-1-arabonelactone
β-methoxy-ε-caprolactone
β-ethoxy-ε-caprolactone
β-isopropoxy-ε-caprolactone
δ-methoxy-ε-caprolactone
δ-ethoxy-ε-caprolactone
β-cyclohexyl-ε-caprolactone β-benzyl-ε-caprolactone
β-phenyl-ε-caprolactone
δ-benzyl-ε-caprolactone
γ-methoxy-ε-caprolactone
γ-ethoxy-ε-caprolactone
γ-phenyl-ε-caprolactone In order to effect the formation of polymer layers as herein contemplated on various substrates and in particular, polyolefin base materials, the monomers (i.e., lactones, lactams and N-vinyl lactams) are subjected to a glow discharge in an evacuated zone in the presence of the substrate whereby polymerization of the monomer and subsequent deposition on the substrate results. To obtain polymerizing conditions for the enumerated monomers requires a very low pressure reaction zone and a suitable voltage source to produce ions or highly energized species from the gaseous monomer and consequent glow discharge within the reaction zone. The species so produced are, of course, electrically charged, and will be drawn to an electrode of opposite charge within the low presure reaction zone. By placing a suitable base so that it interrupts or intercepts the flow of charged particles or a base of suitable electrical potential, a coating in the form of polymer is produced on said base.

In treating continuous length material in the form of films or filaments, it is preferred to operate the process in a continuous manner with the base material continuously being drawn through the low pressure reaction zone between two discharge electrodes, or at least close to one of them, with a sufficient residence time to permit the desired degree of coating.

With residence times of the order of a few seconds to less than about 2 minutes, outstanding molecular films of polymer are produced on the substance.

With substrates other than those of a continuous length, the process can be performed with the object to be treated proximate one of the discharge electrodes or between two of them (discharge occurring between said two electrodes) and after completion of the coating operation the object is removed in the conventional manner.

The general conditions and equipment carrying out the processes of the present invention are as follows:

(1) A suitable reaction zone which can be evacuated to a pressure approximating a good vacuum. Operating pressures are between 0.01 mm. and 10 mm. with the narrower range of .05 to 5 mm. being preferred. It is, of course, understood that the pressure used will be somewhat dependent upon the monomer, those with very low vapor pressures and/or very high boiling points requiring lower operating pressures in order to obtain sufficient gaseous molecules to produce the necessary discharge conditions between the electrodes. It is also contemplated that the monomer may be preheated to obtain sufficient gaseous density to obtain efficient operation of the present process.

(2) A reaction zone through which continuous length material can be drawn. This requires suitable seals. In the event that it is not desired to operate in this manner, it is also possible to have the roll of continuous length substrate within the reaction zone and a suitable take-up roll also therein. The source roll and the take-up roll should be shielded and removed from the glow discharge between electrodes to minimize coating the substrate when in either of these two positions.

(3) A suitable electrode assembly constructed in accordance with the physical nature of the substrate. With continuous length base materials it is preferred to have an elongated electrode assembly and desirably, a plurality of these. A suitable reaction zone and electrode assembly is described in U.S. Patent 3,069,283.

(4) A voltage source of sufficient power to produce a discharge as exemplified by light produced by glow discharge of a noble gas or mercury at a pressure of about 5 mm. of Hg between suitable electrodes. The voltage may range from 250 to 950 A.C. or D.C. with a range of 350 to 500 A.C. or D.C. being preferred. The energy source for this voltage should be capable of a current output of at least about 10 milliamperes per square inch of electrode.

(5) A source of monomer which can be controlled to give the desired and necessary low pressures within the reaction zone. The monomer is introduced continuously or intermittently into the reaction zone while maintaining the low pressure necessary for effecting glow discharge between the electrodes.

The general procedure for carrying out the processes of this invention involves placing the substrate into the reaction zone or providing means for introducing and withdrawing the substrate from the reaction zone as it is being treated, evacuating the reaction zone to a high vacuum (preferably below 1 mm. Hg). then preferably sweeping the reaction zone with gaseous monomer and once again evacuating to about 1 mm. of Hg. The monomer vapor in the reaction zone is then adjusted to the desired level (preferably .05 to 5 mm. of Hg) and maintained at this level by the continuous introduction of monomer as the polymerization and coating is taking place. The substrate is fed between or adjacent the electrode as above described after the glow discharge condition has been reached. The speed of passage of the base through the polymerization and coating zone is adjusted to give the desired degree of coating (molecular thickness). The coated substrate is then recovered from the reaction zone.

The following examples will serve to illustrate the present invention without being deemed limitative thereof. Parts are by weight unless otherwise indicated.

EXAMPLE 1

A roll of film of polyethylene having a thickness of 3 mils is placed into an apparatus as shown in U.S. Patent 3,069,283. The apparatus is evacuated to 0.1 mm. of Hg and then hot N-methyl-2-pyrrolidone is introduced until the pressure is about 100 mm. of Hg. The reaction zone is again evacuated to a pressure of 0.1 mm. of Hg and additional N-methyl-2-pyrrolidone is added dropwise until the pressure is 5 mm. of Hg. A glow discharge is produced using a voltage of 450 volts A.C. The film of polyethylene is fed from the supply roll to the take-up roll at a speed so that the total residence time of a given area of film is 30 seconds between the total electrode length. N-methyl-2-pyrrolidone is added to the reaction zone dropwise to maintain the pressure at 5 mm. of Hg. After the total length of film has been treated, the process is stopped and the spool of film is removed from the equipment. Two equal lengths (10 grams each) of film are cut and one is vigorously rubbed 100 times on both sides with a flannel cloth. Both films along with an equal length of an untreated specimen are immersed in a dyebath containing 150 mg. of Basic Red 14 dyestuff (Color Index, 2nd edition) in 400 ml. of water. The bath is brought to the boil and held there for 2 hours. Both treated films are dyed in an excellent manner. The untreated film is undyed. Further analysis of the treated film indicates a coating of about 5 molecules in thickness. This is further substantiated by chemical analysis which showns about 5 parts per million of a nitrogenous polymer per part of polyethylene.

EXAMPLE 2

Example 1 is repeated employing a pressure of 1 mm. of Hg during the coating procedure. Chemical analysis indicates about one part per million of nitrogenous polymer per part of polyethylene. Excellent dyeings are obtained on the treated film as in Example 1.

EXAMPLE 3

Example 1 is repeated except that the residence time is 1 minute. Somewhat thicker coatings are obtained. Physical tests on the coated film indicate no change in properties thereof. Again, as in Example 1, excellent dyeings are obtained.

EXAMPLE 4

Example 1 is repeated except that the polyethylene used is a filament having a diameter of 2 mils. Similar results are obtained as in Example 1.

EXAMPLE 5

Example 4 is repeated employing the following
(A) polypropylene,
(B) polyacrylonitrile (100%),
(C) polyvinyl chloride,
(D) polyvinylidene chloride,
(E) vinyl chloride (90%)-vinyl acetate (10%) copolymer,
(F) polyethylene terephthalate (Dacron).

EXAMPLE 6

Example 1 is repeated using the following compounds in place of N-methyl pyrrolidone.
(A) 2-pyrrolidone,
(B) 1-methyl-piperidone (2)
(C) γ-valerolactone,
(D) butyrolactone,
(E) zeta-enantholactone,
(F) N-vinyl-2-pyrrolidone,
(G) ε-caprolactam,
(H) ε-caprolactone,
(I) N-vinyl-ε-caprolactam,
(J) N-ethyl-2-pyrrolidone,
(K) N-methyl-ε-caprolactam,
(L) β-ethyl butyrolactone,
(M) 3-ethyl-piperidone (2),
(N) morpholinone,
(O) N-vinyl morpholinone,
(P) N-vinyl oxazolidinone,
(Q) N-isopropyl pyrrolidone.
Excellent coatings similar to Example 1 are obtained.

EXAMPLE 7

Example 1 is again repeated except that the entire reaction zone is maintained at 150° C. and the N-methyl-2-pyrrolidone is replaced by the following compounds:
(A) 3-octyl butyrolactone,
(B) 3-dodecyl valerolactone,
(C) 3-decyl-ε-caprolactone.
Excellent results are obtained. This example demonstrates that process of this invention employing compounds of very low volatility and the concomitant employment of a heated reaction zone to obtain the gaseous state of the monomer, whereas the previous examples all operated at room temperature (i.e., 25° C.)

In operating the process of the present invention with a heated reaction zone, it is preferred, especially where the temperatures in the reaction zone are above about 100° C., to have the film or filament feed and take-up mechanisms outside of the reaction zone to minimize any adverse effects on the substrate. In view of the relatively short residence times required in the reaction zone to obtain the coatings herein described, relatively high temperatures in the reaction zone are permissible without any untoward effects on those substrates which are heat sensitive.

EXAMPLE 8

Examples, 1, 3 and 5 are repeated using in the dyebath, however, Acid Green 25 in place of the dye used in these examples. Similar, excellent results are obtained.

EXAMPLE 9

Examples 6(A) and 6(D) are repeated employing a monomer pressure in the reaction zone as indicated:
(A) 0.01 mm.,
(B) 0.05 mm., (C) 7.5 mm.,
(D) 10.0 mm.

EXAMPLE 10

Examples 6(A) through 6(G) are repeated except that the residence times are as follows:
(A) 5 sec.,
(B) 10 sec.,
(C) 45 sec.,
(D) 2 minutes.

EXAMPLE 11

Example 1 is repeated except that the voltage source is 250 v. D.C.

EXAMPLE 12

Example 5 is again repeated except that the voltage source is varied in different procedures as follows:
(A) 250 v. A.C.,
(B) 250 v. D.C.,
(C) 350 v. A.C.,
(D) 400 v. D.C.,
(E) 500 v. D.C.,
(F) 850 v. A.C.,
(G) 950 v. A.C.

In the above examples there have been exemplified numerous substrates which give excellent results. The treatment of the polyolefin materials leads to particularly outstanding results. Such polyolefins are well known and include as the preferred members thereof the poly-α-olefins which are suitable to produce fibers and films. These polymers may be atactic or isotactic, and may be further characterized by any degree of stereo specificity.

I claim:
1. A process for surface treating a poly-α-olefin which comprises exposing said surface to a gaseous polymerizable compound selected from the group consisting of lactams, lactones and N-vinyl lactams at a pressure below about 10 mm. of Hg, said gaseous polymerizable compound being in an activated state produced by an electrical glow discharge whereby polymerization on the said surface of poly-α-olefin of said gaseous compound occurs to form a polymerizate thereon.

2. A process for surface treating a poly-α-olefin which comprises exposing said surface to a gaseous polymerizable compound selected from the group consisting of lactams, lactones and N-vinyl lactams at a pressure below about 10 mm. of Hg, said gaseous polymerizable compound being in an activated state produced by an electrical glow discharge whereby polymerization on the said surface of poly-α-olefin of said gaseous compound occurs to form a polymerizate thereon, said polymerizate being from about 1 to 10 molecular layers thick.

3. A process as defined in claim 1 wherein the poly-α-olefin is polyethylene.

4. A process as defined in claim 1 wherein the poly-α-olefin is polypropylene.

5. A process as defined in claim 1 wherein the polymerizable compound is a lactone.

6. A process as defined in claim 5 wherein the lactone is butyrolactone.

7. A process as defined in claim 1 wherein the polymerizable compound is a lactam.

8. A process as defined in claim 7 wherein the lactam is 2-pyrrolidone.

9. A process as defined in claim 7 wherein the lactam is N-methyl-2-pyrrolidone.

10. A process as defined in claim 1 wherein the polymerizable compound is an N-vinyl lactam.

11. A process as defined in claim 10 wherein the N-vinyl lactam is N-vinyl-2-pyrrolidone.

12. A process as defined in claim 1 wherein the temperature varies from room temperature to about 500° C.

13. A process for surface treating a poly-α-olefin which comprises exposing said surface in a reaction zone at a pressure below about 10 mm. of Hg at a temperature up to about 500° C. in said reaction to a gaseous polymerizable compound selected from the group consisting of lactams, lactones, and N-vinyl lactams, said gaseous polymerizable compound being in an activated state produced by an electrical glow discharge whereby polymerization on the said surface of poly-α-olefin of said gaseous compound occurs to form a polymerizate thereon, said polymerizate being from about 1 to 10 molecular layers thick.

14. A process as defined in claim 13 wherein the poly-α-olefin is polyethylene and the gaseous polymerizable compound is a lactam.

15. A process as defined in claim 14 wherein the lactam is N-methyl-2-pyrrolidone and the reaction zone temperature is about room temperature.

16. A process as defined in claim 13 wherein the electrical glow discharge is produced by a voltage ranging from about 250 to 950 volts.

17. A process as defined in claim 16 wherein said gaseous polymerizable compound is a lactam and the poly-α-olefin is polyethylene.

18. A process as defined in claim 16 wherein said gaseous polymeriable compound is a lactam and the poly-α-olefin is polypropylene.

References Cited

UNITED STATES PATENTS

| | | | |
|---|---|---|---|
| 2,778,793 | 1/1957 | Thomas et al. | 204—165 |
| 2,925,314 | 2/1960 | Eisele et al. | 8—100 X |
| 3,068,510 | 12/1962 | Coleman | 117—93 X |
| 3,256,364 | 6/1966 | Bryant et al. | |
| 3,274,089 | 9/1966 | Wolinski | 204—165 |
| 3,281,263 | 10/1966 | Priesing et al. | |
| 3,316,328 | 4/1967 | Press. | |

ALFRED L. LEAVITT, Primary Examiner.

J. H. NEWSOME, Assistant Examiner.

U.S. Cl. X.R.

8—55, 100; 117—138.8; 204—165, 174, 177